(12) United States Patent
Lake

(10) Patent No.: US 6,258,268 B1
(45) Date of Patent: Jul. 10, 2001

(54) CONTAINER FILTER BOX FOR DE-WATERING SOLIDS

(76) Inventor: John W. Lake, 19460 Cavanagh Way, Bakersfield, CA (US) 93312

(*) Notice: Subject to any disclaimer, the term of this patent is extended or adjusted under 35 U.S.C. 154(b) by 0 days.

(21) Appl. No.: 09/710,540

(22) Filed: Nov. 9, 2000

(51) Int. Cl.$^7$ .............................. C02F 11/12; B01D 29/05; B01D 29/25
(52) U.S. Cl. .......................... 210/238; 210/241; 210/477; 210/482; 210/484
(58) Field of Search .................................... 210/238, 241, 210/477, 482, 484

(56) References Cited

U.S. PATENT DOCUMENTS

| | | |
|---|---|---|
| 4,871,454 | * 10/1989 | Lott . |
| 4,929,353 | * 5/1990 | Harris . |
| 5,589,081 | * 12/1996 | Harris . |
| 5,595,654 | * 1/1997 | Caughman, Jr. . |
| 5,681,460 | * 10/1997 | Caughman, Jr. . |
| 5,707,535 | * 1/1998 | Harris . |
| 6,004,461 | * 12/1999 | Harris . |
| 6,146,528 | * 11/2000 | Caughman, Jr. . |

FOREIGN PATENT DOCUMENTS

3801817 * 8/1989 (DE) .

* cited by examiner

Primary Examiner—Thomas M. Lithgow
(74) Attorney, Agent, or Firm—Lyon & Lyon LLP

(57) ABSTRACT

A filter box of the type used for separating solid materials from liquid having an outer shell constructed of a liquid impervious material and an inner shell having perforated sides and flooring and being disposed within said outer shell and spaced therefrom so as to define a material collection area between the two shells. Upon loading liquid-laden material into the filter box through the open upper end thereof, liquid and smaller particles pass through the perforated sides and flooring of the inner shell into the collection area leaving the larger solids within the inner shell for removal. One end of the filter box defines a hinge-mounted door for providing access to the interior of the filter box for removal of the larger solids as well as access to one end of the material collection area. One or more movably mounted hatch plates are provided in the flooring of the inner shell adjacent the opposite end of the box from the hinged access door to provide additional access to the material collection area so that the area can be washed clean following use. To prevent solids from falling down between the inner and outer shells during loading, the inner shell defines an outwardly projecting lip which extends over and about the opening between the inner and outer shells at the upper ends thereof.

6 Claims, 3 Drawing Sheets

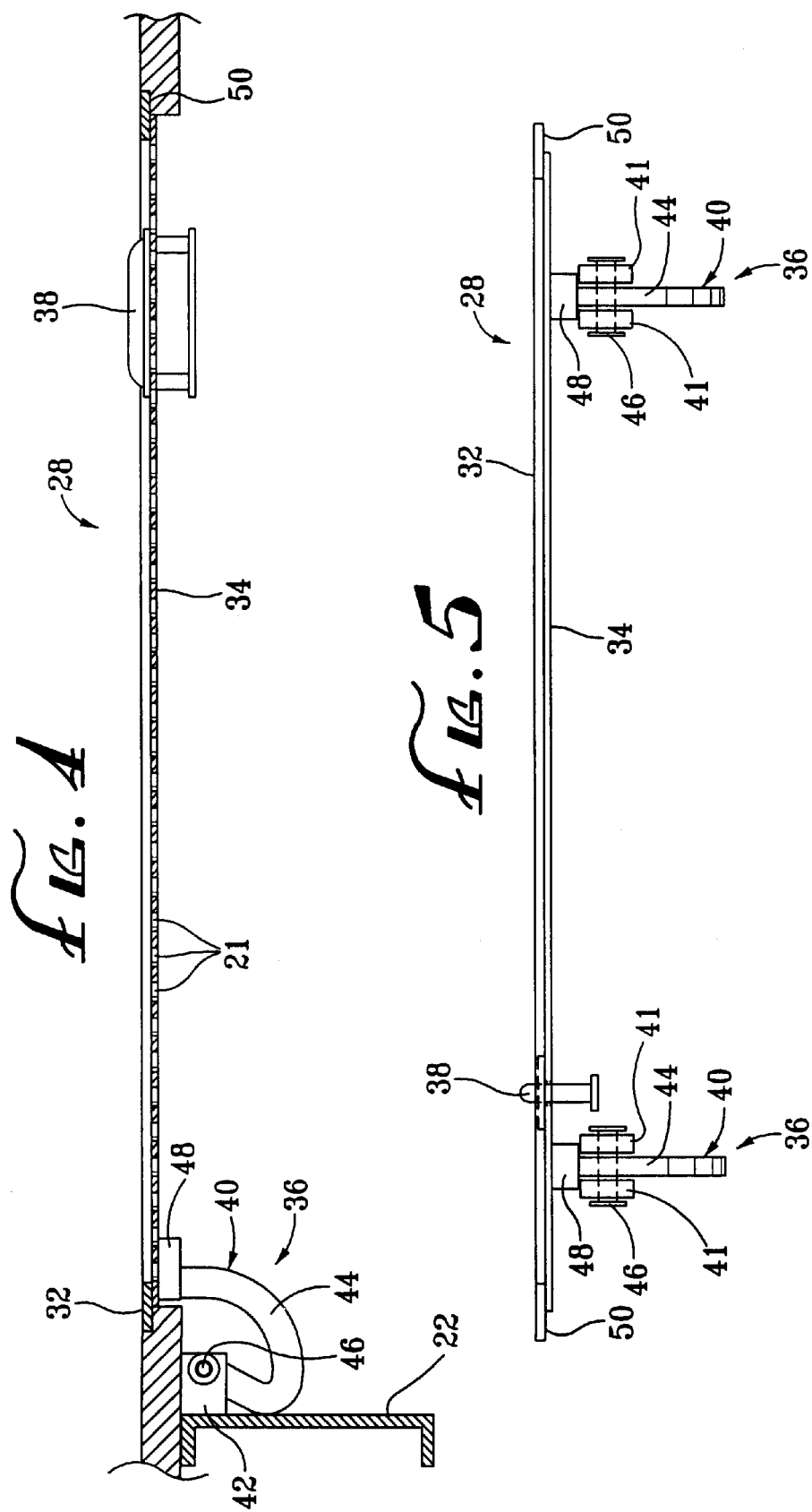

CONTAINER FILTER BOX FOR DE-WATERING SOLIDS

BACKGROUND OF THE INVENTION

Container filter boxes are commonly used to separate solid particles from a mixture of solids and liquid (usually water) for disposal. Examples of applications for such filter boxes include filtering wet contaminated soil from a construction site where the liquid is drained from the sludge prior to disposal and filtering sediment taken from the bottoms of refinery storage tanks which is generally a heavily liquid-laden material. Typically, container filter boxes comprise an outer liquid-impermeable rectangular shell having an open upper end and an inner filtering shell having an open upper end and perforated bottom, side and end walls. The inner shell is supported within and spaced from the outer shell by a support frame so as to define a material collection area between the inner and outer shells. The inner shell is lined with a disposable filter cloth of a desired mesh size. These filter boxes are loaded with sludge or other liquid-laden material through their open upper end, whereupon liquid and smaller solid particles pass through the filter cloth liner and the perforated inner shell into the spacing between the inner and outer shells where they are removed through drains provided on the bottom of the outer shell. The inner and outer shells also define a large hinged door at one end of the box to provide access to the interior of the filter box for removal of the larger solid material retained on the inner shell. However, some of the finer solids which pass through the perforated inner shell of the filter box do not pass through the drains and become trapped between the inner and outer shells. Solid material also falls into the area between the walls of the two shells during the loading of the filter box which can both contaminate the liquid collected between the bottom walls of the shell and add to the volume of trapped solid material. Removal of the trapped material is attempted by directing water under pressure through the perforations in the inner shell with the hinged end door in the open position in an effort to flush the trapped solid particles out from between the shells through the open ends of the two shells. Users of these container boxes, however, have experienced substantial difficulty in obtaining a thorough cleaning of these boxes following use. The filter box of the present invention both obviates the cleaning problem and prevents solids from passing between the walls of the box during loading.

SUMMARY OF THE INVENTION

Briefly, the present invention relates to container filter boxes having an outer shell with an open upper end and constructed of a liquid-impermeable material and an inner shell having perforated sides and flooring and an open upper end. The inner shell is optionally provided with a disposable filter cloth liner and disposed within the outer shell and spaced therefrom so as to define a material collection area between the two shells. Upon loading liquid-laden material into the filter box through the open upper end thereof, the liquid and smaller solids pass through the filter liner and perforated sides and flooring of the inner shell into the collection area leaving the larger solids within the inner shell for removal. One end of the filter box defines a hinge-mounted door for providing access to the interior of the box for removal of the larger solids as well as access to one end of the material collection area. In the present invention, one or more pivotally mounted perforated hatch plates are provided in the flooring of the inner shell adjacent the opposite end of the filter box from the hinged access door, and optionally in the side walls of the inner shell, to provide additional access to the material collection area. By positioning the hatch plates at the opposite ends of the filter box from the hinged end door, the user, upon completion of the filtering operation, can open the hatch plates and the hinged end door and direct a flow of pressurized water from a location proximate the hatch plates through the entire length of the filter box between the inner and outer shells and thereby effectively wash out any material trapped therein. To prevent solids from falling down between the inner and outer shells of the filter box during loading, the inner shell defines an outwardly projecting lip which extends over and about the opening between the inner and outer shells at the upper ends thereof thereby preventing possible contamination, reducing the volume of solids in the collection area and generally increasing the efficiency of the filtering process.

It is therefore the principal object of the present invention to provide a container filter box for de-watering which facilitates thorough cleaning of the filter box following the filtration process and improves separation of solids and liquids.

It is another object of the present invention to provide a container filter box for de-watering which reduces contamination in the bottom of the container by preventing the passage of unfiltered solids between the upper ends of the inner and outer shells and into the bottom of the container.

These and other objects and advantages of the present invention will become readily apparent from the following detailed description taken in conjunction with the accompanying drawings.

IN THE DRAWINGS

FIG. 4 is a sectional view taken along the line 4—4 in FIG. 3 illustrating the scaling lip on the inner shell of the filter box of the present invention.

FIG. 5 is an end view of a clean out hatch plate employed in the present invention.

DESCRIPTION OF THE PREFERRED EMBODIMENT

Figure 1:
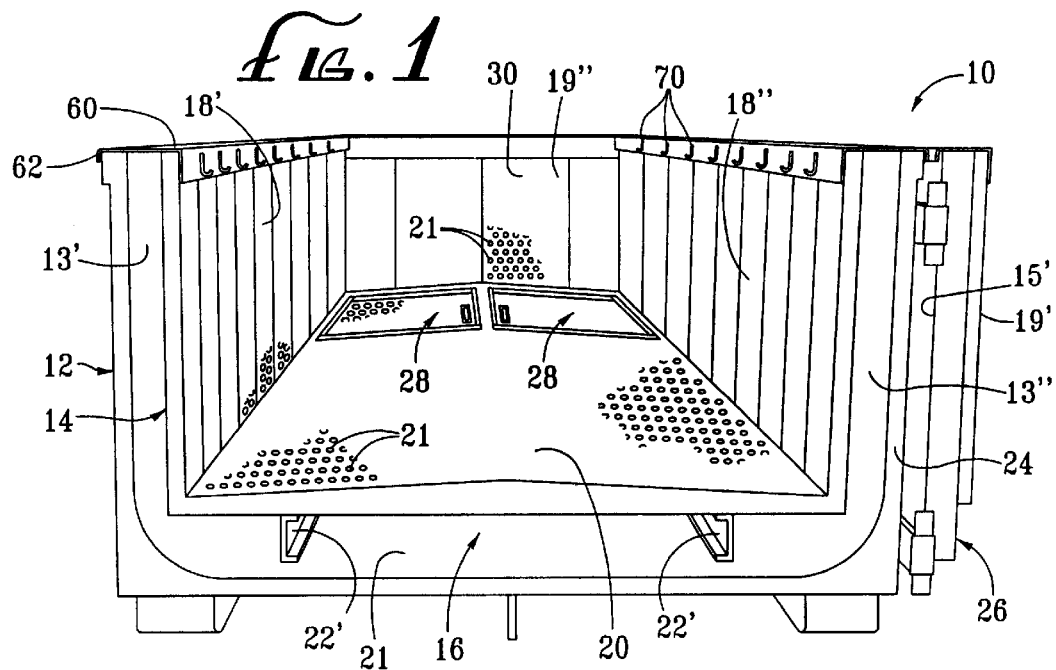
FIG. 1 is a perspective view of the container filter box of the present invention with the forward end door in the open position.

Referring now in detail to the drawings, the container filter box 10 of the present invention is rectangular in configuration and comprises an outer shell 12 preferably constructed of metal so as to be of a durable construction and impervious to liquid and an inner filtering shell 14 which is liquid pervious and disposed within and spaced from outer shell 12 so as to define a spacing or material collection area 16 therebetween. Outer shell 12 defines solid side walls 13' and 13" and end walls 15' and 15" and has an open upper end so as to accommodate the insertion of inner shell 14 therein. Inner shell 14 also has an open upper end and defines side walls 18' and 18" and end walls 19' and 19" which are all preferably constructed of expanded metal and a bottom wall or flooring 20 preferably formed of metal sheeting having a large number of filtering apertures or holes 21 formed therein. The inner shell 14 is preferably bolted in place in outer shell 12 and is carried by a support frame 22 disposed between the inner and outer shells. Typically, filter boxes 10 are sized so as to hold from about 20 yards of material to about 30 yards. However, boxes as small as about 3 yards are also used.

The expanded metal which forms the side and end walls of the inner shell 14 is of conventional construction and is supported by a plurality of upstanding steel bars 22' on support frame 22. Perforated plates and woven wire screens could, however, also be employed in lieu of expanded metal in the construction of inner shell 14. The flooring 20 of inner shell 14 is preferably defined by a plurality of ⅜ inch diameter holes 21 on ½ inch centers arranged in a staggered pattern such that upon filling the filter box 10 with a material comprised of solids and liquid, the liquid and smaller solids will pass readily through the holes 21 into the collection area 16 between the inner and outer shells 14 and 12. Solids larger than the perforations in flooring 20 will be retained on the flooring. Other perforated or apertured configurations could be employed in both the side and end walls of inner shell 14 as well as in the flooring 20 thereof to provide the desired filtering of the solid material. As used herein, the term "perforations" includes both holes or other shaped apertures as well as the openings formed by the expanded metal process and by metal screens.

Figure 2:
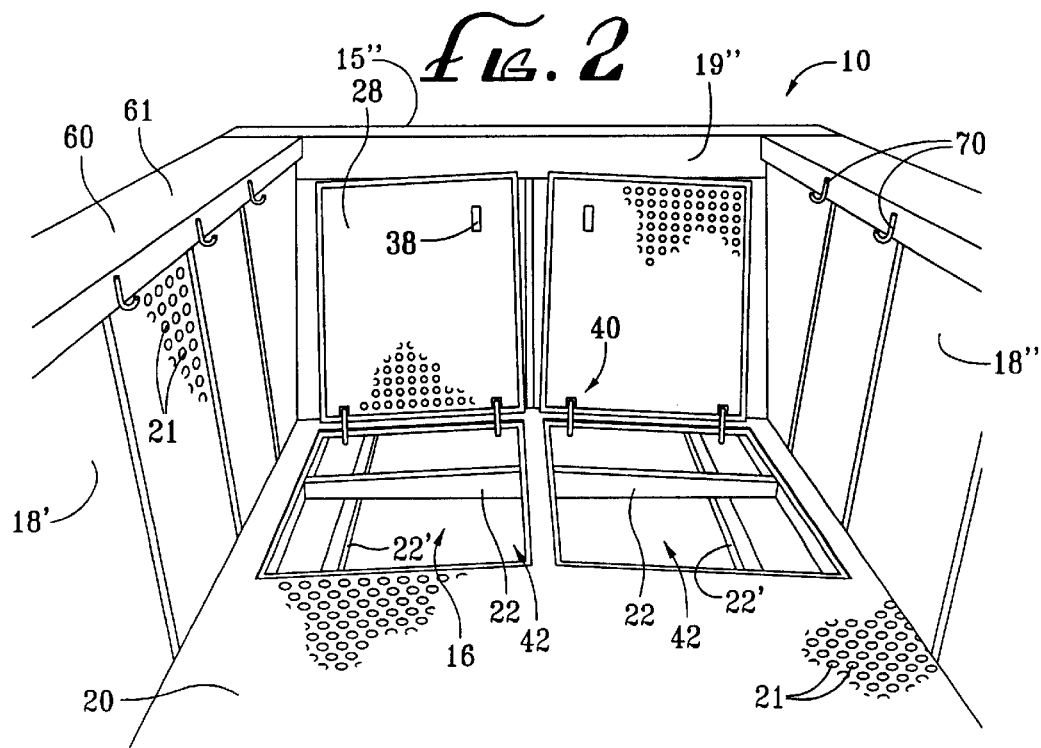
FIG. 2 is a perspective view of the rear portion of the container filter box of the present invention illustrating the clean-out hatches in the open position.
Figure 3:
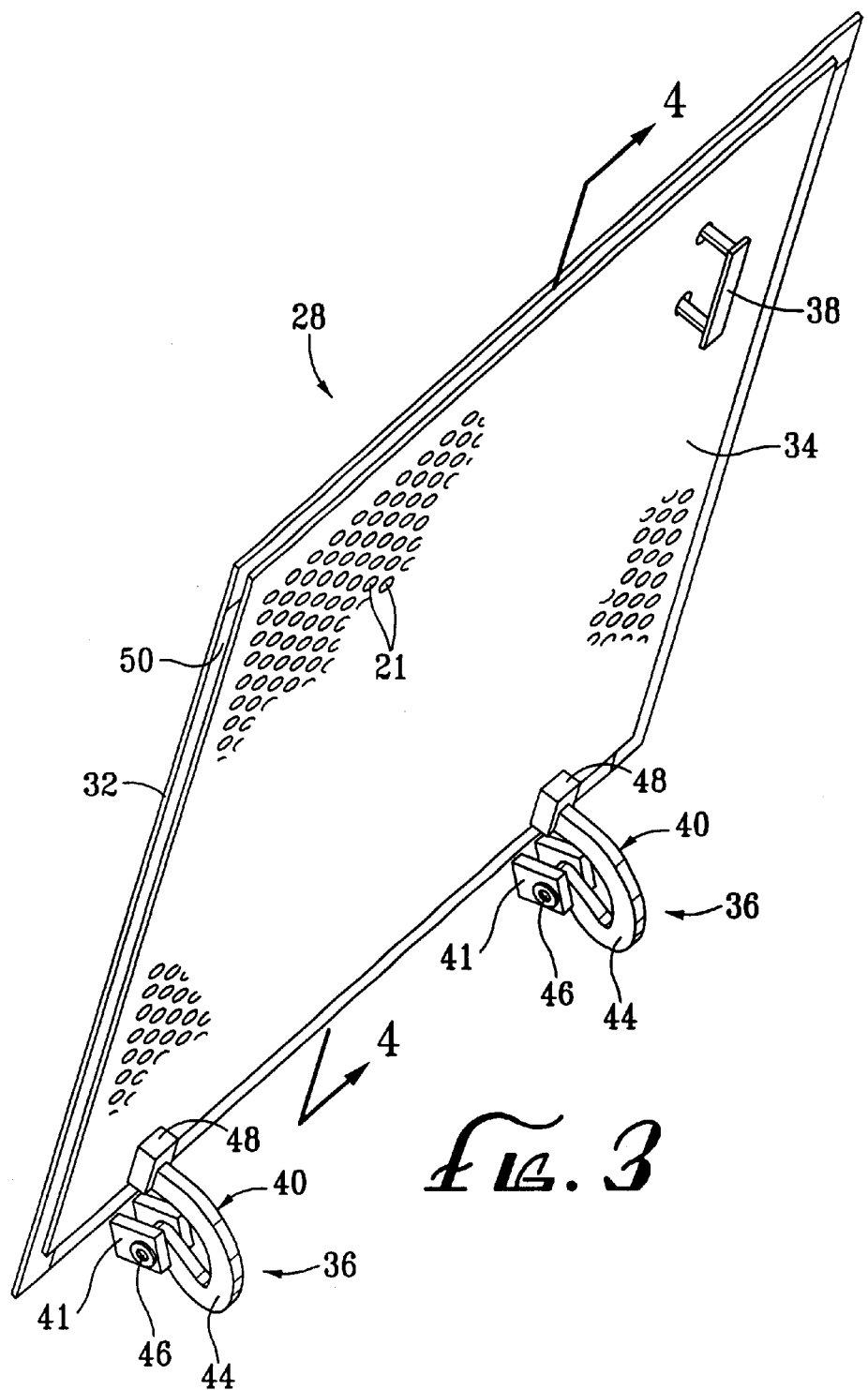
FIG. 3 is an enlarged perspective view of one of the clean-out hatch plates in the container filter box of the present invention.

The support frame 22 in filter box 10 can be arranged in any desired pattern and is preferably constructed of elongated steel bars 22' and beams 22" to provide both rigidity and support for the side and end walls and the flooring of the inner shell while maintaining the spacing between flooring 20 and the bottom surface 15 of outer shell 12 when the filter box is filled with liquid-laden material. Frame 22 is also configured so as to convexly slope the flooring 20 downwardly and outwardly from the center thereof as best seen in FIG. 2 so as to avoid over stressing the flooring when fully loaded. One end 24 of filter box 10 is provided with a large hinged door 26 to provide access to the interior of inner shell 14 and facilitate removal of solid material from the filter box 10 after use and to provide access to one end of the material collection area 16. Door 26 is comprised of walls 15' and 19' of the outer and inner shells 12 and 14 and is provided with a locking mechanism 27.

A pair of perforated hatch plates 28 are provided in flooring 20 adjacent the rear end wall 30 of filter box 10 to provide additional access to the material collection area 16 at locations on the opposite side of area 16 from the access provided by hinged door 26. This hatch and door configuration allows one to readily clean the material collection area 16 by directing a flow of pressurized water from the rear end of area 16 through the open hatch plates to the forward end adjacent hinged door 26.

Each hatch plate 28 is preferably comprised of a rectangular support frame 32, a perforated metal sheet 34 spanning and carried by frame 32 and a pair of hinge assemblies 36. The perforations in sheet 34 are preferably of the same size and configurations as the perforations throughout flooring 20 of inner shell 14. Each perforated hatch plate 28 is also provided with a handle 38 and a pair of pivot assemblies 40 for pivotally mounting the hatch plate over an access opening 42. Each pivot assembly comprises a bracket 41 which is welded at its upper or rear end surfaces to the inner shell support frame 22, a generally "J"-shaped hinge bar 44 which is pivotally mounted on bracket 41 by hinge pin 46 and secured at its upper end to a hatch plate 28 by means of a hinge bar spacer 48 which is welded onto the hatch plate frame 32. As seen in FIG. 5 and the frame 32 of hatch plate 34 also provides an overhang 50 about the perimeter of frame 32 so that the hatch plate 28 can rest on inner shell support frame 22 in the down or closed position. In the open position, the hatch plates 28 rest against the outwardly tapered rear end wall of the filter box 10 defined by the end walls 15" and 19" of shells 12 and 14. While other coverings such as slidable and removable perforated plates (not shown) could be provided over the access openings 42, the pivotally mounted hatch plates 28 are preferred.

The upper end portions of the side and end walls of inner shell 14 have secured thereto a generally inverted "U"-shaped lip 60 having an elongated bar portion 61 which extends along the upper end portions of the side and end walls of inner shell 14 and outwardly therefrom, spanning the open areas between the upper ends of inner shell 14 and outer shell 12, and terminating in a downwardly directed flange 62 which extends about the upper end portions of the side and end walls of the outer shell 12. Lip 60 effectively prevents solids from falling down between the inner and outer shells of filter box 10 during the loading of the filter box through its open upper end.

A plurality of support hooks 70 are preferably secured to lip 60 which project inwardly therefrom as seen in FIG. 1 so as to support an interior cloth filter lining of a desired mesh size (not shown) for inner shell 14 to enable the user, if they so desire, to cover the perforated metal walls and flooring of inner shell 14 with a finer fabric filter material to filter and thus separate smaller particles from the liquid than the expanded metal side walls and apertured flooring 20 of inner shell 14.

Various changes and modifications may be made in carrying out the present invention without departing from the spirit and scope thereof. Insofar as these changes and modifications are within the purview of the appended claims, they are to be considered as part of the present invention.

I claim:

1. In a rectangular container filter box of the type used for separating solid materials from liquid and having an outer shell constructed of a liquid-impervious material and defining a pair of upstanding side and end walls, a bottom wall and an open upper end, and an inner shell disposed within said outer shell and defining a pair of upstanding side and end walls, a bottom wall and an open upper end, said walls having perforations therein to allow the passage of liquid and small solids therethrough, and a frame assembly for supporting said inner shell within said outer shell such that said inner shell is spaced from said outer shell so as to define a liquid material collection area therebetween, and a door at one end of said filter box comprising proximately spaced end walls of the inner end outer shells, the improvement comprising:

at least one opening in said bottom wall of said inner shell proximate the opposite end of said inner shell from said door and communicating with the material collection area, a hatch plate mounted on said bottom wall of said inner shell over each such opening and movable between an open position and a closed position, each such hatch plate comprising a support frame and a perforated sheet of material carried by and spanning said support frame Such that in said open position, said hatch plate provides unobstructed access to said liquid material collection area through said opening and in said closed position covers said opening and is substantially coplanar with said bottom wall of said inner shell so as to define a substantially uninterrupted continuation of the perforated bottom wall of said shell and allow the passage of liquid and small solids therethrough whereby upon moving said hatch plate to the open position and moving the end door of the filter box to the open position, one can direct pressurized water flow through the length of said material collection area for a thorough flushing of material therefrom.

2. The improvement of claim 1 including an outwardly projecting lip carried by said inner shell and projecting from the upper ends of said side and end walls thereof over and about upper end portions of said side and ends walls of said outer shell whereby material is prevented from passing between said inner and outer shells during the loading of said filter box.

3. The improvement of claim 1 wherein the bottom wall of the inner shell defines two planar surfaces, said surfaces sloping outwardly and downwardly in opposed directions from a central axis and each of said surfaces having one of said openings therein and one of said hatch plates mounted thereon over said opening.

4. The improvement of claim 1 wherein said opposite end of said inner shell is inclined outwardly and each hatch plate is pivotally mounted on said bottom wall of said inner shell over an opening therein such that in said open position, said plate bears against the inclined end of said inner shell and is thereby held in the open position to provide unobstructed access to said liquid material collection area.

5. The improvement of claim 3 including an outwardly projected lip carried by said inner shell and projecting from the upper ends of said side and end walls thereof over and about upper end portions of said side and ends walls of said outer shell whereby material is prevented from passing between said inner and outer shells during the loading of said filter box.

6. The improvement of claim 4 including an outwardly projected lip carried by said inner shell and projecting from the upper ends of said side and end walls thereof over and about upper end portions of said side and ends walls of said outer shell whereby material is prevented from passing between said inner and outer shells during the loading of said filter box.

* * * * *